UNITED STATES PATENT OFFICE.

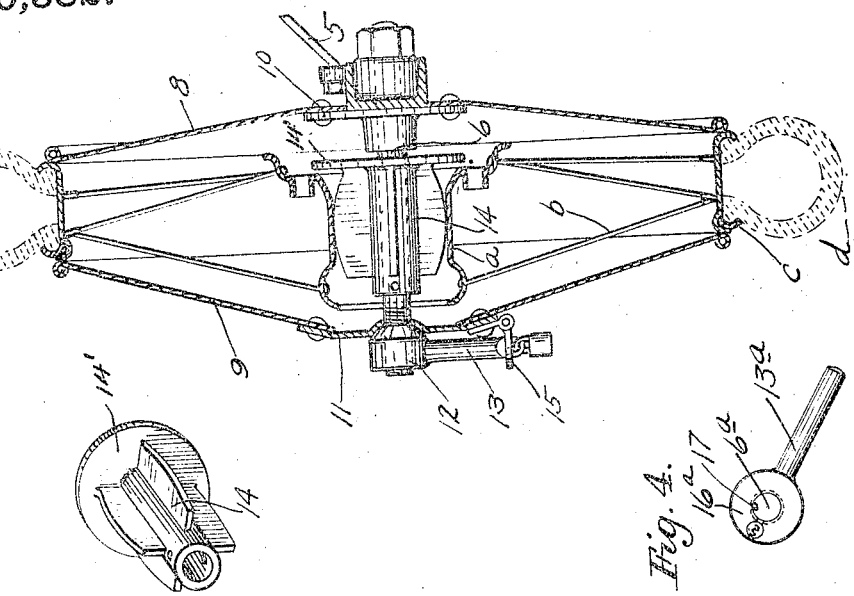
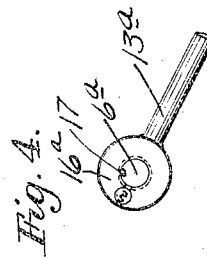
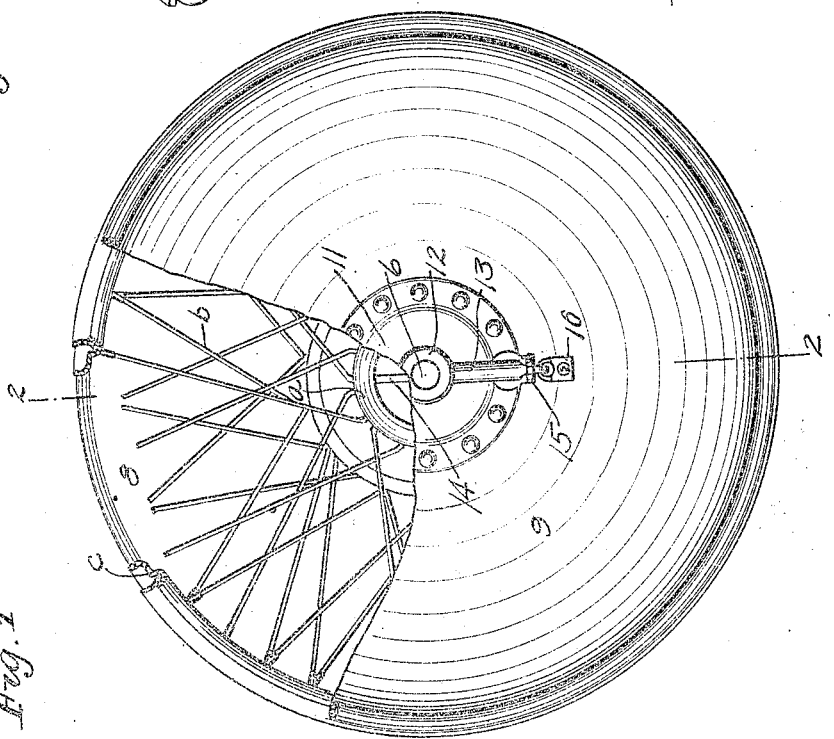

EMIL R. DRAVER, OF RICHMOND, INDIANA.

WHEEL-CARRIER.

1,320,382.  Specification of Letters Patent.  Patented Nov. 4, 1919.

Application filed May 24, 1917. Serial No. 170,631.

*To all whom it may concern:*

Be it known that I, EMIL R. DRAVER, a citizen of the United States, residing at Richmond, in the county of Wayne and State of Indiana, have invented certain new and useful Improvements in Wheel-Carriers; and I do hereby declare the following to be a full, clear, and exact description of the invention, such as will enable others skilled in the art to which it appertains to make use the same.

My invention has for its object to provide an extremely simple and efficient wheel carrier, and is in the nature of a modification of, or improvement on the combined carrier and cover disclosed and claimed in my pending application, S. N. 155,647, filed March 19, 1917.

Particularly, the present carrier is designed for use in connection with extra wire wheels of automobiles, and it is designed to carry such wheels regardless of whether or not the wheel is equipped with a tire.

The improved device comprises an axial spindle, a relatively fixed back plate and a removable outer plate combined with means for clamping the two plates against a peripheral portion of the wheel, to wit, either against the tire or against the metal rim of the wheel. However, as an important feature of the invention, the front and back plates, at their perimeters or rim portions, are arranged to directly engage the edges of the rim of the extra wheel clamped between them and located on the spindle of the carrier. This feature is essentially desirable, because it is the common practice of manufacturers of automobiles to supply extra wheels without extra tires applied thereon, and it is even then desirable to supply a carrier that is a complete operative device. In this arrangement, the front and rear or inner and outer plates coöperate with the rim of the wheel to form a complete inclosing case. Moreover, with this arrangement, the device is just as well adapted to hold the extra wheel when equipped with a tire. If a flexible cover be provided over the tire of such a wheel, its edges are adapted to be clamped between the edges of the wheel rim and the rim edges of the back and front plates.

In the accompanying drawings which illustrate the invention, like characters indicate like parts throughout the several views.

Referring to the drawings:

Figure 1 is an elevation looking at the rear of the carrier with a portion of the same broken away to illustrate the position of the wheel.

Fig. 2 is a vertical section taken on the line 2—2 of Fig. 1.

Fig. 3 is a perspective view showing in detail the so-called spindle sleeve removed from the spindle; and Fig. 4 is a detail in rear elevation illustrating a modification of the nut-acting clamping lever of the carrier.

The carrier may be applied to an automobile in various different ways, but it will be assumed to be applied to the bracket secured to the rear, either of the body or of the running gear.

The numeral 5 indicates a bracket that is rigidly secured, either to the rear portion of an automobile frame or to the rear portion of the body thereof, and which serves to support the improved carrier. The axial spindle 6 is rigidly secured to the bracket and projects horizontally rearward therefrom. The relatively fixed so-called back plate 8 and the removable outer plate 9 are made reversely concavo-convex or conical, and they are provided respectively with hub plates 10 and 11, advisably made up in the form of castings and slipped onto the spindle 6. The hub of the back plate may, if desired, be rigidly or permanently secured to the spindle, but the hub of the plate 9 must be removable from said spindle. The outer end of the spindle 6 is threaded and a clamping nut 12, having a lever extension 13, works with threaded engagement thereon. Moreover, the nut 12 is preferably provided with an approximately semi-spherical face that engages a conical seat in the hub plate 11. In view of this ball and socket engagement, and the clearance between the spindle and the hub plate 11, the outer plate 9 is made universally adjustable to the wheel at its outer edge. The peripheries of the two plates 8 and 9 are preferably beaded, so that they are not only stiffened thereby, but are rounded and made smooth.

Inasmuch as the hubs of the wire wheels which are now generally used are very large, a flanged spindle sleeve 14 is preferably telescoped onto the spindle 9, and if desired, pinned, or otherwise, rigidly but detachably secured thereto. It is desirable to make both of the plates 8 and 9 of quite thin metal both for economy and for lightness. The structure of an ordinary wire wheel is such that it is necessary to give the front or outer plate 9 much more curvature than the back plate and this makes the front plate much more rigid than the back plate and more capable of standing lateral pressure. The back plate should have sufficient rigidity to insure a tight joint between the same and the wheel rim or tire, as the case may be. Hence, I provide the sleeve 14 with an outstanding disk-like stop flange 14', against which the hub of the wheel is adapted to be pressed when sufficient pressure is applied to the outer plate to slightly spring the back plate (see particularly Fig. 2), which shows the hub slightly out of engagement with said flange. The hub-engaging stop above noted, as is obvious, relieves the back plate from excessive pressure, and assists in firmly holding the wheel against rattling or vibratory movements of the spindle.

The free end of the nut lever 13 is shown as perforated and adapted to be inserted through a perforated hasp 15 that is engaged to the flange of the hub plate 11 of the detachable outer plate 9. A padlock 16 being inserted through the perforated end of the arm 13, the latter will be locked to plate 9 and thereby held against rotation, so that the nut 12 will not accidentally loosen.

The wire wheel shown is of standard construction, such as is now in general use and the parts thereof may be briefly noted as follows: *a* indicates the wheel hub; *b* the spokes, *c* the metal rim and *d* the pneumatic tire of said wheel.

Fig. 4 illustrates a modification of the lever-equipped nut 13ª, wherein a key-operated lock 16ª is inserted into the said nut and has a detent that engages with the notch 17 in the spindle 6ª.

What I claim is:

1. An extra wheel carrier comprising a back plate and an axially projecting wheel supporting spindle having means for securing the same to a vehicle, an outer plate removably mounted on the projecting portion of said spindle and when applied serving to prevent the removal of the wheel from the spindle, and means on the outer end of said spindle for forcing said outer plate toward said back plate to thereby clamp the peripheral portion of said plates against the peripheral portion of the wheel supported on said spindle.

2. A wheel carrier comprising a back plate, a relatively fixed spindle projecting therefrom, an outer plate removably applied on said spindle, the said back and outer plates having laterally spaced rim portions engageable with peripheral portions of an extra wheel, and a nut working with threaded engagement on the outer end of said spindle to force said outer plate toward said back plate, the said outer plate being mounted for a limited universal wabbling movement on said spindle to adapt its rim to the wheel.

3. A wheel carrier comprising a back plate, a spindle projecting axially therefrom, means for securing said spindle to a vehicle, said spindle being constructed to fit a wheel hub and thereby support the same, an outer plate removably applied to the projected end of said spindle, the rims of said plates being arranged for engagement with the peripheral portion of a wheel mounted on said spindle, and means on the end of said spindle for adjustably forcing said outer plate toward said back plate, said spindle carrying a hub engaging stop to relieve said back plate from excessive pressure.

4. An extra wheel element carrier comprising a back plate, and an axially projecting spindle having means for securing the same to a vehicle, an outer plate removably mounted on the projecting portion of said spindle, and when applied, serving to prevent the removal of said wheel element from between said two plates, means on the outer end of said spindle for forcing the outer plate toward said back plate to thereby clamp the peripheral portions of said plates against the peripheral portion of said wheel element.

5. An extra wheel element carrier comprising a back plate, and an axially projecting spindle having means for securing the same to a vehicle, an outer plate removably mounted on the projecting portion of said spindle, and when applied, serving to prevent the removal of said wheel element from between said two plates, means on the outer end of said spindle for forcing the outer plate toward said back plate to thereby clamp the peripheral portions of said plates against the peripheral portion of said wheel element, and a stop fixed in respect to said spindle and engageable with said wheel element to relieve said back plate from excessive pressure.

6. An extra wheel element carrier comprising a back plate, and an axially projecting spindle having means for securing the same to a vehicle, an outer plate removably mounted on the projecting portion of said spindle, and when applied, serving to prevent the removal of said wheel element from between said two plates, means on the outer end of said spindle for forcing the outer plate toward said back plate to thereby clamp the peripheral portions of said plates against the peripheral portion of said wheel element, and a positive lock for securing said clamping means fixed on said spindle.

In testimony whereof I affix my signature in presence of two witnesses.

EMIL R. DRAVER.

Witnesses:
 ORRIN DRAVER,
 I. C. HOFFMAN.